United States Patent
Allen et al.

(10) Patent No.: US 10,558,691 B2
(45) Date of Patent: Feb. 11, 2020

(54) SENTIMENT NORMALIZATION BASED ON CURRENT AUTHORS PERSONALITY INSIGHT DATA POINTS

(71) Applicant: International Business Machines Corporation, Armonk, NY (US)

(72) Inventors: Corville O. Allen, Morrisville, NC (US); Joseph N. Kozhaya, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 15/242,794

(22) Filed: Aug. 22, 2016

(65) Prior Publication Data

US 2018/0052910 A1    Feb. 22, 2018

(51) Int. Cl.
| | |
|---|---|
| *G06F 7/04* | (2006.01) |
| *G06F 16/00* | (2019.01) |
| *G06F 16/33* | (2019.01) |
| *G06F 16/93* | (2019.01) |
| *G06F 16/332* | (2019.01) |
| *G06F 16/335* | (2019.01) |

(52) U.S. Cl.
CPC .......... *G06F 16/334* (2019.01); *G06F 16/337* (2019.01); *G06F 16/3329* (2019.01); *G06F 16/93* (2019.01)

(58) Field of Classification Search
CPC ......... G06F 17/30011; G06F 17/30675; G06F 17/30654; G06F 17/30702; G06F 17/30705; G06F 16/93; G06F 16/334; G06F 16/3329; G06F 16/337; G06F 16/35; G06N 99/005
See application file for complete search history.

(56) References Cited

U.S. PATENT DOCUMENTS

| | | | |
|---|---|---|---|
| 7,987,188 B2 | 7/2011 | Neylon et al. | |
| 8,356,025 B2 | 1/2013 | Cai et al. | |
| 8,515,739 B2 | 8/2013 | Godbole et al. | |
| 9,189,797 B2 | 11/2015 | Ghosh et al. | |
| 2004/0205448 A1 | 10/2004 | Grefenstette | |

(Continued)

OTHER PUBLICATIONS

Rohrdantz et al. "Feature-Based Visual Sentiment Analysis of Text Document Streams," ACM Transactions on Intelligent Systems and Technology (TIST), vol. 3, No. 2, Article 26, Feb. 2012, 25 pages.
Viegas et al., "Studying Cooperation and Conflict between Authors with history flow Visualizations," Proceedings of the SIGCHI conference on Human factors in computing systems, Vienna, Austria, Apr. 2004, 8 pages.
Kaur et al., "Emotion Detection and Sentiment Analysis in Text Corpus: A Differential Study with Informal and Formal Writing Styles," International Journal of Computer Applications, vol. 101—No. 9, Sep. 2014, 9 pages.

(Continued)

*Primary Examiner* — Bruce M Moser
(74) *Attorney, Agent, or Firm* — VanLeeuwen & VanLeeuwen; Feb R. Cabrasawan

(57) ABSTRACT

An approach is provided that analyzes electronic document sets, each of the sets written by a different author. The analysis includes performing a normalized sentiment analysis of the documents which results in normalized sentiment scores that pertain to each of the authors. The normalize sentiment scores are stored in a data store that is accessible from a question answering (QA) system. The question answering system then receives a sentiment-based question. Responsively, the QA system generates a qualitative set of candidate answers, with the candidate answers based at least in part on the normalized sentiment scores retrieved from the data store.

14 Claims, 10 Drawing Sheets

(56) References Cited

U.S. PATENT DOCUMENTS

| | | | |
|---|---|---|---|
| 2005/0086045 A1* | 4/2005 | Murata | G06F 17/27 704/2 |
| 2010/0262454 A1 | 10/2010 | Sommer | |
| 2010/0306192 A1 | 12/2010 | Kapur et al. | |
| 2013/0018824 A1* | 1/2013 | Ghani | G06N 20/00 706/12 |
| 2014/0164036 A1 | 6/2014 | Prieto | |
| 2014/0280371 A1* | 9/2014 | Bastide | G06F 17/30705 707/803 |
| 2014/0337097 A1 | 11/2014 | Farlie | |
| 2015/0170051 A1* | 6/2015 | Bufe, III | G06N 3/126 706/13 |
| 2016/0098480 A1* | 4/2016 | Nowson | G06F 17/2785 707/738 |
| 2017/0358035 A1* | 12/2017 | Benfield | H05K 999/00 |

OTHER PUBLICATIONS

Dutta et al., "Sentiment Detection in Online Content: A WordNet Based Approach," Swarm, Evolutionary, and Memetic Computing, Springer International Publishing, vol. 8947 of the series Lecture Notes in Computer Science, pp. 409-420.

Kazi et al., "Context Based Citation Summary of Research Articles: A Step Towards Qualitative Citation Index," IEEE International Conference on Computer, Communication and Control (IC4-2015), Indore, India, Sep. 2015, 6 pages.

Allen et al., "Time-Based Sentiment Normalization Based on Authors Personality Insight Data Points," U.S. Appl. No. 15/242,813, filed Aug. 22, 2016, 45 pages.

"List of IBM Patents or Patent Applications Treated as Related," Letter from Leslie A. Van Leeuwen, Aug. 22, 2016, 1 page.

\* cited by examiner

SENTIMENT NORMALIZATION BASED ON CURRENT AUTHORS PERSONALITY INSIGHT DATA POINTS

BACKGROUND OF THE INVENTION

Technical Field

This disclosure relates to normalizing sentiment derived from various authors.

Description of Related Art

Sentiment analysis involves using Natural Language Processing (NLP) techniques to identify and extract subjective information in text under consideration. Such sentiment analysis data is often used when ingesting data into a corpus utilized by a question answering (QA) system. Existing techniques return sentiment polarity (e.g., positive, negative, or neutral, etc.) in an overall source document or at a more granular level, such as at an entity level. These techniques return a numerical score for the sentiment to indicate the strength or weakness of the sentiment. However, none of the traditional techniques of sentiment analysis take into consideration the personality traits of the individual expressing the sentiment. In addition, none of the traditional techniques of sentiment analysis take into consideration the changing nature of the individual expressing the sentiment over time, often based on the individual's life-experiences over time.

SUMMARY

An approach is provided that analyzes electronic document sets, each of the sets written by a different author. The analysis includes performing a normalized sentiment analysis of the documents which results in normalized sentiment scores that pertain to each of the authors. The normalize sentiment scores are stored in a data store that is accessible from a question answering (QA) system. The question answering system then receives a sentiment-based question. Responsively, the QA system generates a qualitative set of candidate answers, with the candidate answers based at least in part on the normalized sentiment scores retrieved from the data store.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
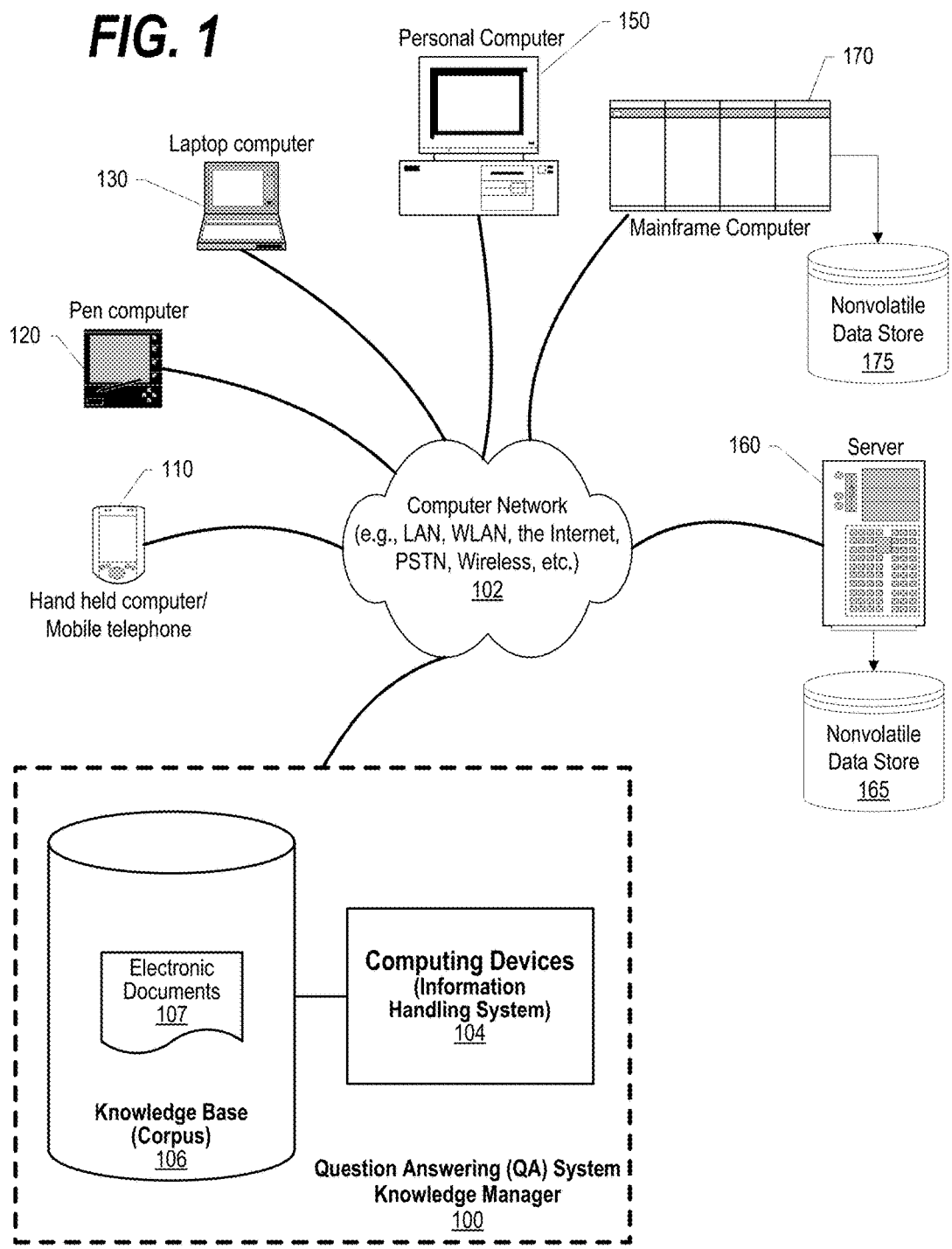
FIG. 1 depicts a block diagram of a processor and components of an information handling system.

FIGS. 1-10 describe an approach that relates to sentiment analysis of text. Specifically, this approach provides a method for personalizing sentiment scoring for an author. A core aspect of the approach is the normalization of a sentiment score for an author based on an analysis of documents from the author over a period of time. The idea is to account for the fact that certain authors may simply be overly positive or overly negative about an entity, concept or topic over a period of time. For example, supporters for a given political candidate may be generally positive about that political candidate, thereby making it difficult to isolate documents (i.e. social media posts) that are more positive than usual. Likewise, supporters for an opposing political candidate may be generally negative about the political candidate over a period of time, thereby making it difficult to isolate documents that are more negative than usual. This makes it easier to answer queries about reactions to events amongst persons that generally support the political candidate, or generally dislike a political candidate. The same can be applied to any entity, concept or topic, such as sports, international conflicts, etc. The approach operates by receiving a corpus of documents from an author (for example, posts and articles from the author), extracting the relevant entities, concepts and topics, and for each topic, identify a collection of relevant documents, sort the documents by time, and compute the tone, or sentiment, for the collection of documents over time. Once the sentiment over time for a topic for an author is determined, it is stored and used to normalize the sentiment of any specific document from that author. In addition, an approach is provided to identify an author's sentiment during a particular period of time. For example, an author may be a supporter of one political party during the 1990s, and a different political party during the 2000s. Based upon the date of a document by the author, the sentiment that the author was conveying during that period of time can be used, rather than an overall sentiment of the author during all periods of time.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
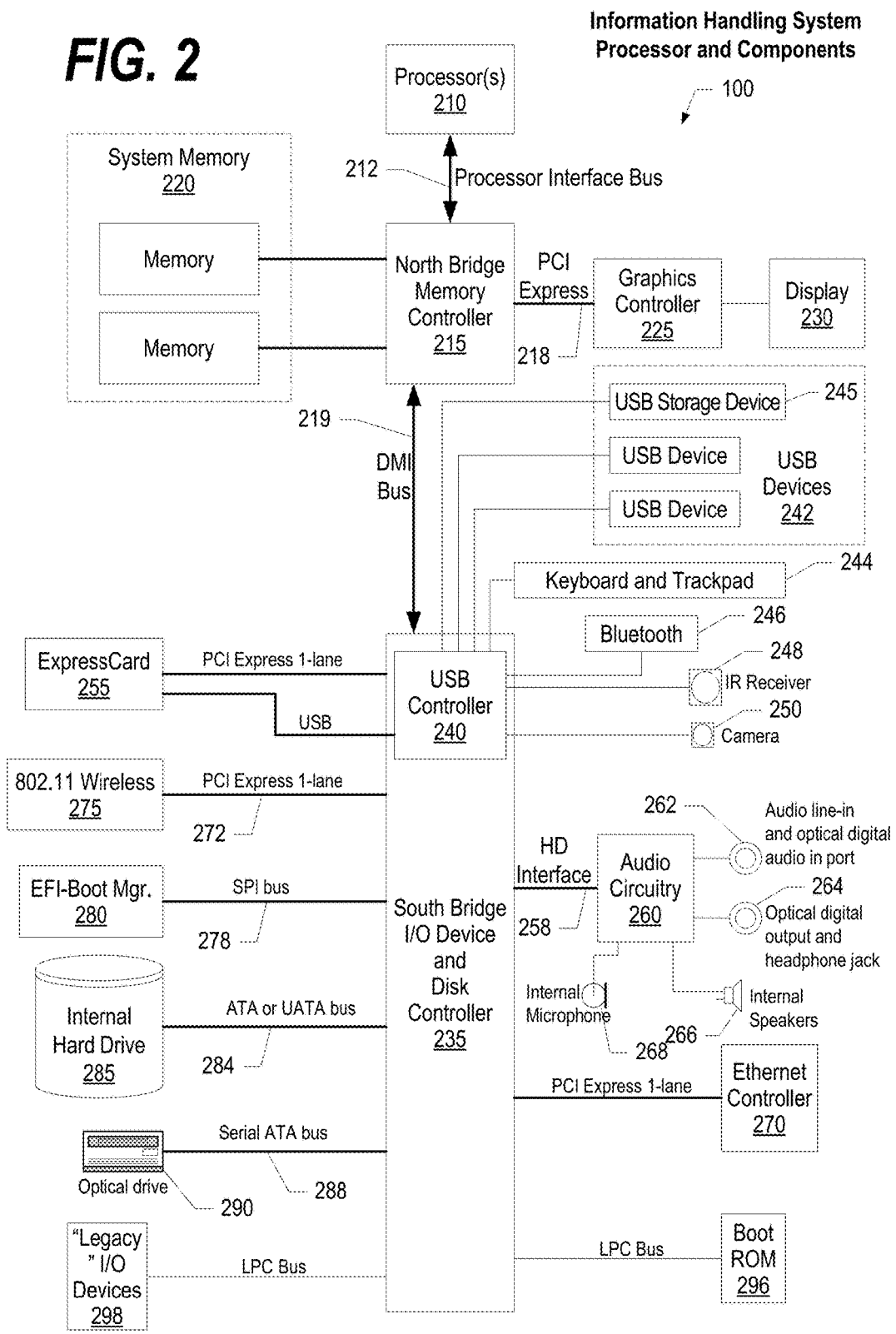
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE .802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
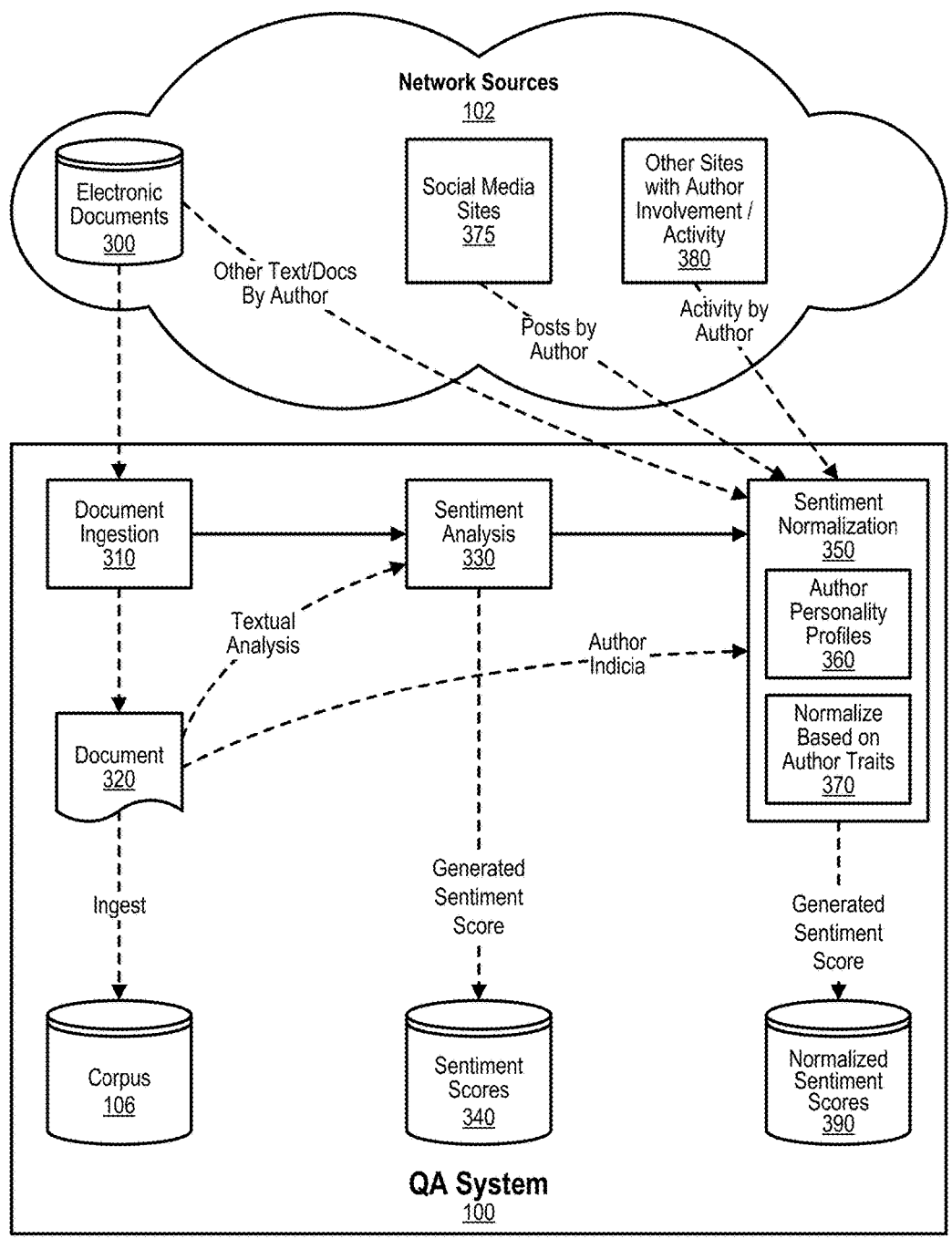
FIG. 3 is a component diagram that depicts the interaction of components used in providing sentiment normalization based on current authors personality insight data points.

FIG. 3 is a component diagram that depicts the interaction of components used in providing sentiment normalization based on current authors personality insight data points. At step 310, the document ingestion process retrieves data for ingestion into QA system 100 system 100 from a wide variety of electronic documents 300. Document ingestion 310 results in documents 320 being ingested into corpus 105 of QA system 100. Sentiment analysis process 330 performs a textual analysis of the documents being ingested into corpus 106. The result of sentiment analysis process 330 is a traditional sentiment score that is stored in sentiment scores data store 340. Sentiment normalization process 350 receives author data pertaining to documents 320 being ingested into corpus 106. The sentiment normalization process retrieves data from network sources 102, such as other electronic documents 300 written by the author, social media site data 375 with posts and other works by the author, and other sites, such as blogs and the like, where the author has activity or involvement. The text written by the author is analyzed by sentiment normalization process 350 to ascertain the author's personality. For example, the analysis may reveal that the author is a strong advocate for a particular political party, so opinions by the author supporting the political party or in line with the party's positions would be expected, while writings by the other not in line with the party's positions would be unexpected. The sentiment normalization process develops author personality profiles 360. These profiles can be further grouped, or clustered, based on the personality traits indicated in the profiles. The author personality profiles are then used to normalize sentiment data found in ingested documents. A sentiment expressed by an author that is strongly inline with the author's profile is adjusted because of the author's likelihood to have such feelings. For example, if the author of text ingested into corpus 106 expresses a sentiment strongly disapproving of a particular international trade agreement, but the author's profile shows that the author is strongly aligned with a political party or position that strongly disfavors any international trade agreements, then the sentiment expressed by the author is normalized by adjusting the sentiment from a "strong" sentiment to a less strong sentiment. By normalizing sentiments across numerous authors and ingested documents, a more realistic sentiment can be found in the normalized data. The normalized sentiment scores are stored in data store 390.

Figure 4:
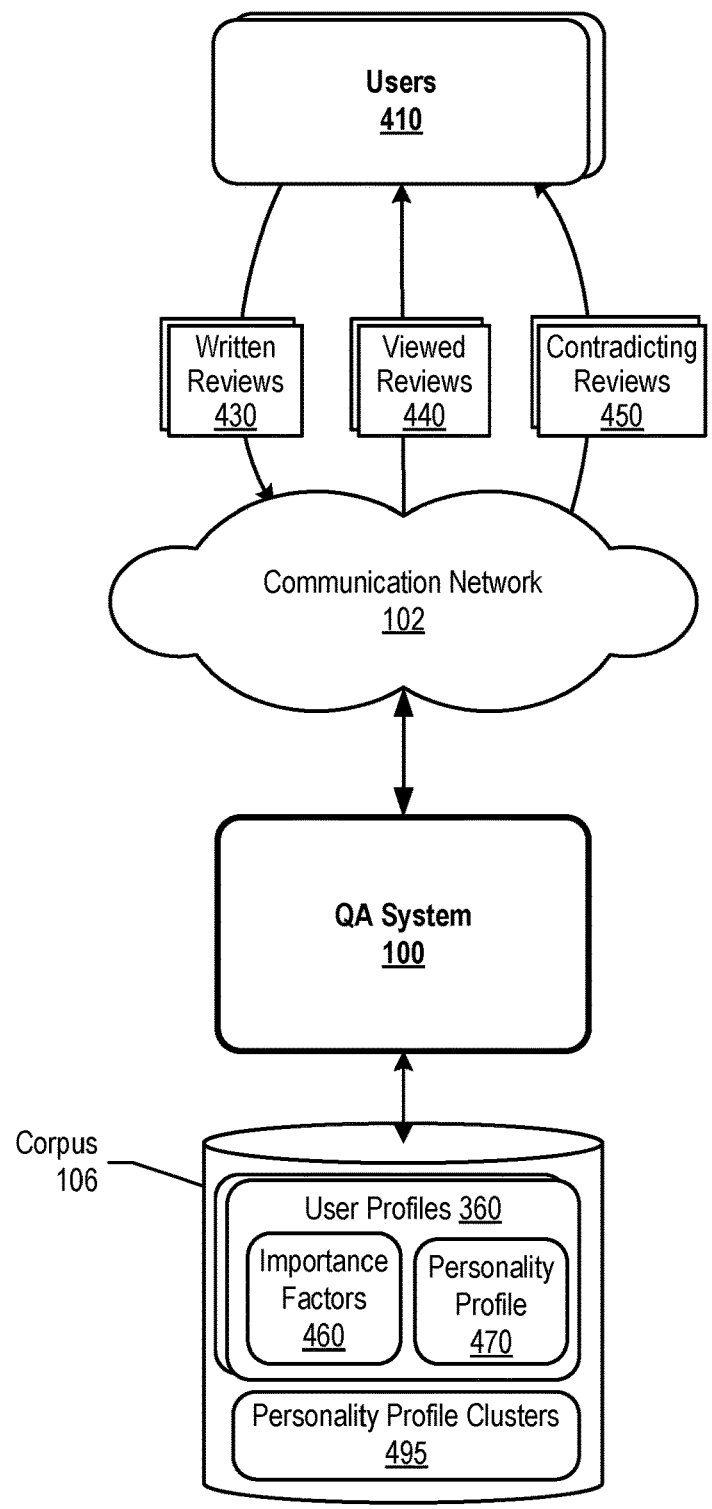
FIG. 4 is a depiction of data flows to users of a question-answering (QA) system while providing sentiment normalization.

FIG. 4 is a depiction of data flows to users of a question-answering (QA) system while providing sentiment normalization. Users 410, such as authors, provide written opinions and other reviews 430 that include sentiment-based data. These opinions and reviews are stored in various network sources, such as social media sources, blogs, and other textual sources. The network sources are accessible from communications network 102, such as the Internet. QA system 100 ingests such opinions and reviews and generates normalized sentiment scores pertaining to the various authors.

FIG. 4 depicts some of the data that is maintained in corpus 106 utilized by QA system 100 to provide normalized-sentiment scores and answers to sentiment-based questions. User profiles 360 include profile data of the various authors and indicate individual author's propensity, or bias, towards or against a particular issue or opinion. User profiles 360 can be seen as including importance factors 460 and the actual personality profile 470. As the name implies, importance factors are those factors that have been shown to be important to a particular author and may be associated with particular sentiment-based words or phrases, while personality profile 470 is individual to a particular author and provides associations to electronic documents that were gathered to generate the importance factors of the author as well as the subjective strength of the various importance factors (e.g., how strongly the author has been shown to support a particular opinion, cause, issue, etc.). Personality profile clusters 495 are used by the QA system to group personality profiles based on the importance factors of the various authors included in a common group. Personality profile clusters 495 are also associated with sentiment-based words and phrases.

In one embodiment, author's personality profiles have a time component that indicates how the author's personality, and associated sentiment-based words and phrases, has changed over time. For example, an author that is a political commentator may have had more liberal viewpoints when initially reporting and commenting on political viewpoints, but the author's personality may have shifted to being more moderate, and even conservative, over the author's career. The time-based component provides further granularity that allows the author's viewpoints expressed in electronic documents to be matched to the author's personality that was expressed during the same time period as the electronic document. For example, an electronic document written early in the author's career could be viewed as being written by an author with a liberal political personality profile, but another electronic document written much later in the same author's career can be viewed as being written by an author with a more conservative political personality profile. Likewise, the normalized sentiment scores would reflect the time period during which the author wrote a particular opinion, review, article, post, or the like.

Figure 5:
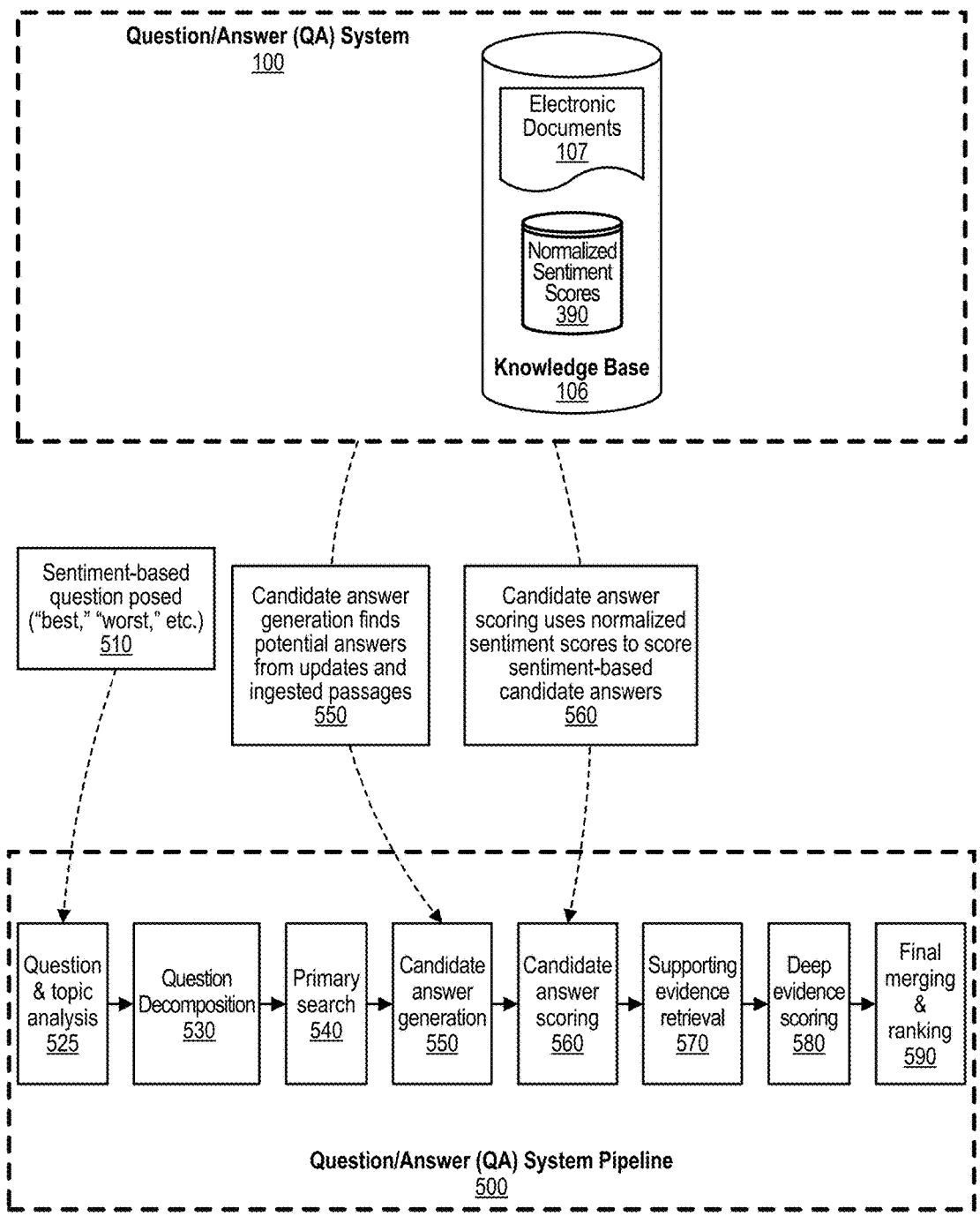
FIG. 5 is a depiction of a QA system pipeline utilized in providing qualitative answers based on normalized sentiment scores included in the QA system corpus.

FIG. 5 is a depiction of a QA system pipeline utilized in providing qualitative answers based on normalized sentiment scores included in the QA system corpus. FIG. 5 is a component diagram depicting the various components of the QA system that answers questions posed by requestors using the multi-corpus knowledge base with weighting normalized sentiment scores. Corpus 106 shows electronic documents 107 and normalized sentiment scores 390 being utilized by the QA system. Corpus 106 is updated using the corpus ingestion processing shown in FIG. 3, while normalized sentiment scores 390 are updated using the sentiment normalization process shown in FIG. 3 as well as in FIGS. 7-10.

QA system pipeline 500 is broken down to depict many of the individual pipeline steps included in the QA system pipeline. Question 510 posed to the QA system is depicted as a sentiment-based question, such as a question pertaining to qualitative and/or subjective characteristics. An example of a sentiment-based questions might be "what is the best place to take a family for vacation?"

At step 525, the QA system pipeline performs the question and topic analysis process. At step 530, the QA system pipeline performs the question decomposition process. At step 540, the QA system pipeline performs the primary search process. At step 550, the QA system pipeline performs the candidate answer generation process. At step 560, the QA system pipeline performs the candidates answer scoring process. At step 570, the QA system pipeline performs the supporting evidence retrieval process. At step 580, the QA system pipeline performs the deep evidence scoring process. At step 590, the QA system pipeline performs the final merging and ranking process.

Many of the steps can utilize normalized sentiment scores 390. Two of the steps that utilize the normalized sentiment scores when responding to sentiment-based questions are the candidate answer generation step (step 550) and the candidate answer scoring step (step 560). At step 550, the pipeline's candidate answer generation process finds potential answers from ingested passages (corpus data store 106). Because of the subjective nature of these passages, many of such passages have an associated normalized sentiment score At step 560, the process performs candidates answer scoring. In step 560, passages with higher normalized sentiment scores are given more weight than other passages.

Figure 6:
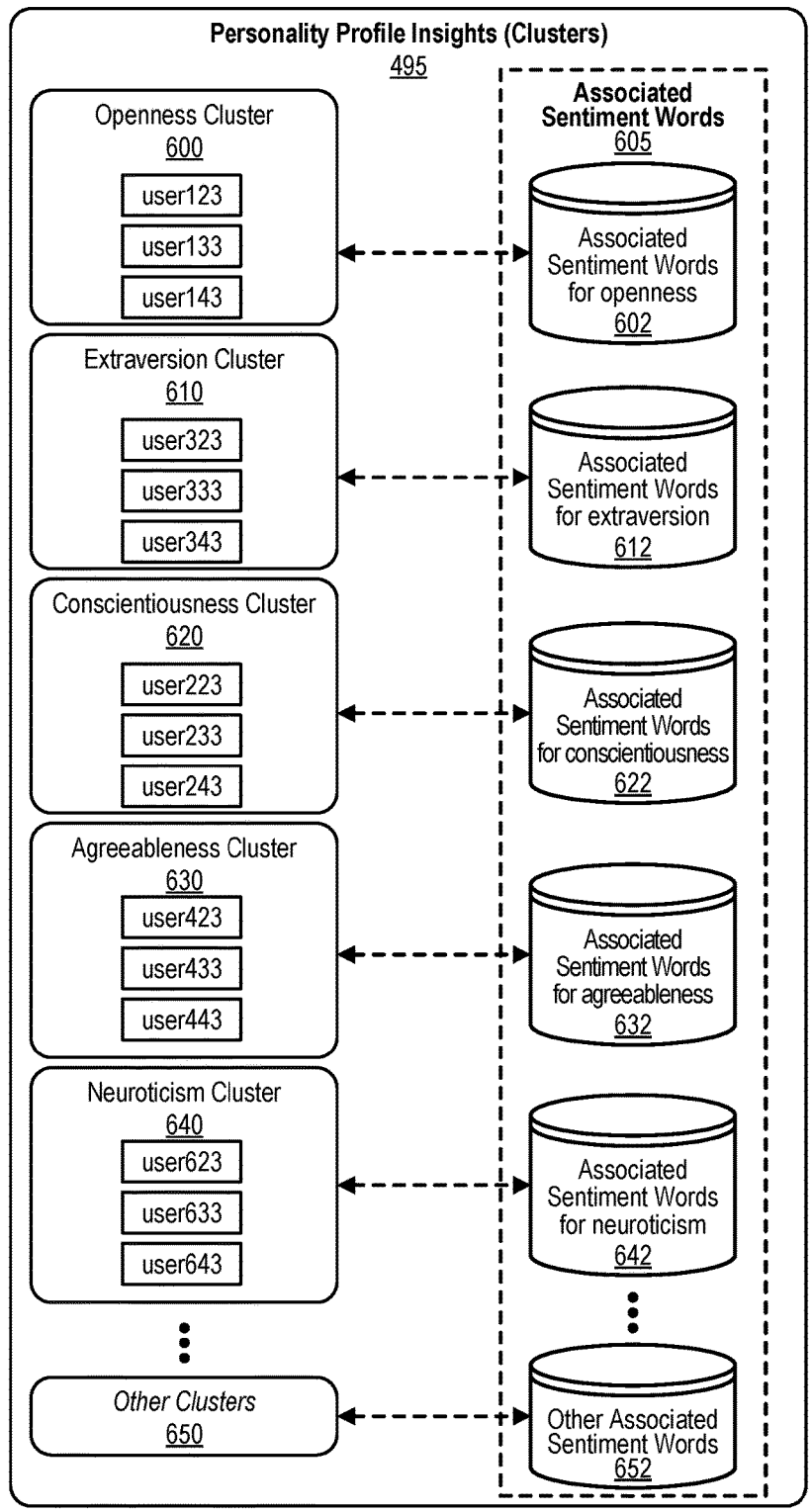
FIG. 6 is a depiction of the clustering of personality profile insights.

FIG. 6 is a depiction of the clustering of personality profile insights, or clusters, 495. Various clusters are depicted along the left side of the diagram, including openness cluster 600, extraversion cluster 610, conscientiousness cluster 620, agreeableness cluster 630, neuroticism cluster 640, and any number of other clusters 650.

Sentiment words and phrases associated with each of the clusters is depicted as data stores along the right side of the diagram. Each of the data stores is associated with a different cluster. In the example shown, data store 602 includes sentiment words for "openness" and is associated with openness cluster 600, data store 612 includes sentiment words for "extraversion" and is associated with extraversion cluster 610, data store 622 includes sentiment words for "conscientiousness" and is associated with conscientiousness cluster 620, data store 632 includes sentiment words for "agreeableness" and is associated with agreeableness cluster 630, data store 642 includes sentiment words for "neuroticism" and is associated with neuroticism cluster 640, and data store 652 includes other sentiment words and is associated with other clusters 650. Any number of clusters and associated sentiment words can be included in personality profile insights 495.

Figure 7:
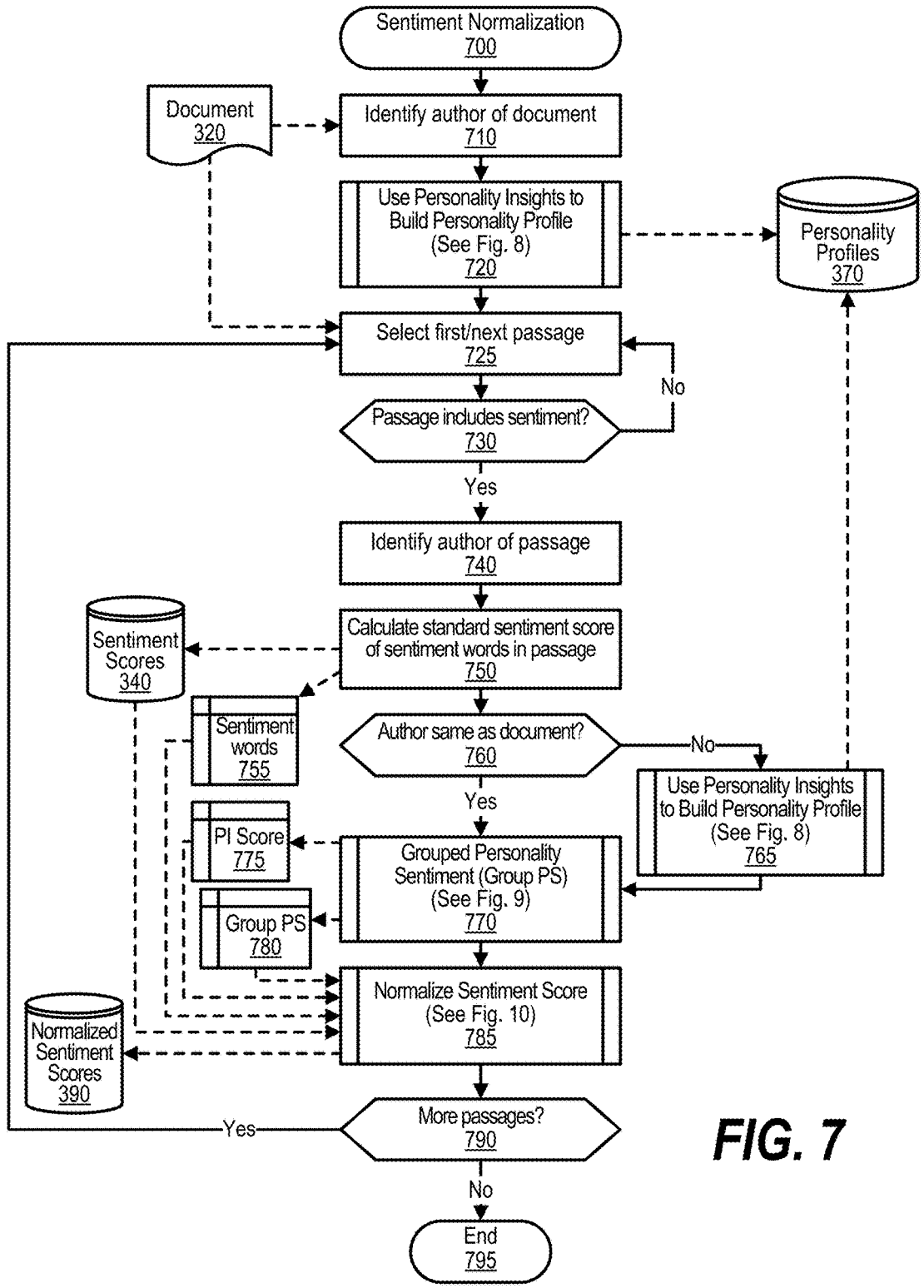
FIG. 7 is a depiction of a flowchart showing the logic used to analyze and normalize sentiment data utilized in the QA system.

FIG. 7 is a depiction of a flowchart showing the logic used to analyze and normalize sentiment data utilized in the QA system. FIG. 7 processing commences at 700 and shows the steps taken by a process that sentiment Normalization. At step 710, the process identifies the author of document 320 that is being ingested into the QA system. At predefined process 720, the process performs the Use Personality Insights to Build Personality Profile routine (see FIG. 8 and corresponding text for processing details). The author's personality profile is stored in data store 360 along with the personality profiles of other authors whose work has been ingested into QA system 100.

At step 725, the process selects the first passage from document 320. The process determines as whether the selected passage includes sentiment data, such as opinion data or qualitative data (decision 730). If the selected passage includes sentiment data, then decision 730 branches to the 'yes' branch to process the sentiment data from the passage. On the other hand, if the selected passage does not include sentiment data, then decision 730 branches to the 'no' branch which loops back to continue scanning passages from the document. At step 740, the process identifies the author of the selected passage which might be a different author than the author of the overall document. At step 750, the process calculates a standard sentiment score of the sentiment words found in the selected passage. Step 750 stores the standard sentiment score in data store 340 and stores the sentiment words found in the selected passage in memory area 755. The process determines whether the author of the selected passage is the same as the author of the document (decision 760). If the author of the selected passage is the same as the author of the document, then decision 760 branches to the 'yes' branch bypassing predefined process 765. On the other hand, if the author of the selected passage is a different author, then decision 760 branches to the 'no' branch to perform predefined process 765. At predefined process 765, the process performs the Use Personality Insights to Build Personality Profile routine for the author of the selected passage (see FIG. 8 and corresponding text for processing details).

Figure 9:
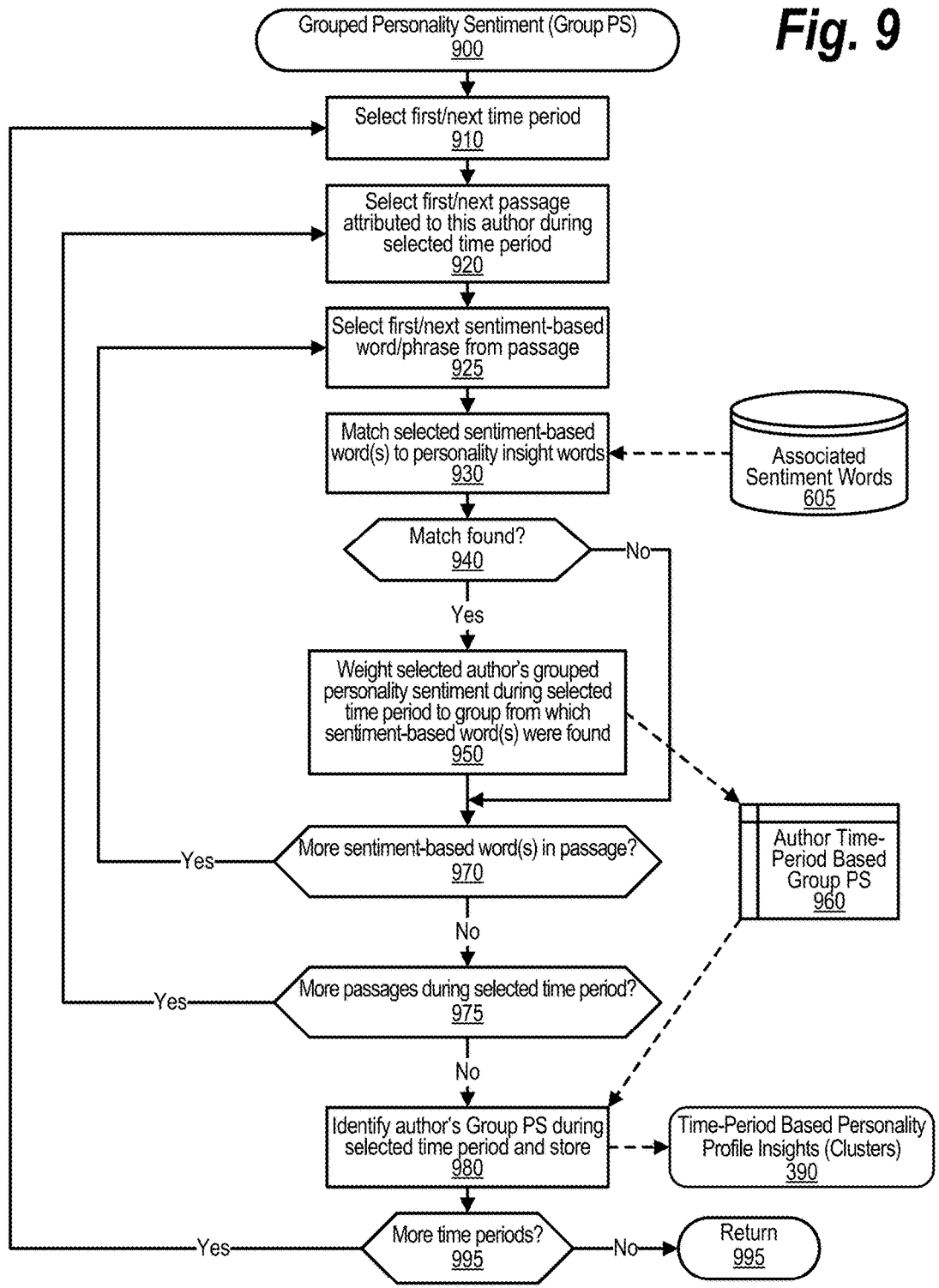
FIG. 9 is a depiction of a flowchart showing the logic used to identify author's group personality sentiments over different time periods.

At predefined process 770, the process performs the Grouped Personality Sentiment (Group PS) routine (see FIG. 9 and corresponding text for processing details). This routine groups, or clusters, author personality profiles based on similarities found in such profiles. Predefined process stores the personality insight (PI) score in memory area 775 and the group personality sentiment in memory area 780. At predefined process 785, the process performs the Normalize Sentiment Score routine (see FIG. 10 and corresponding text for processing details). This routine normalizes the sentiment score based upon the author's profile and relationship with the sentiment words found in the passage. This routine takes as inputs the standard sentiment word score, the sentiment words found in the passage (stored in memory area 755), the personality index (PI) score (stored in memory area 775), and the group personality sentiment (stored in memory area 780).

The process determines as to whether there are more passages in document 320 to process (decision 790). If there are more passages to process, then decision 790 branches to the 'yes' branch which loops back to step 725 to select and process the next passage. This looping continues until there are no more passages to process, at which point decision 790 branches to the 'no' branch exiting the loop. FIG. 7 processing thereafter ends at 795.

Figure 8:
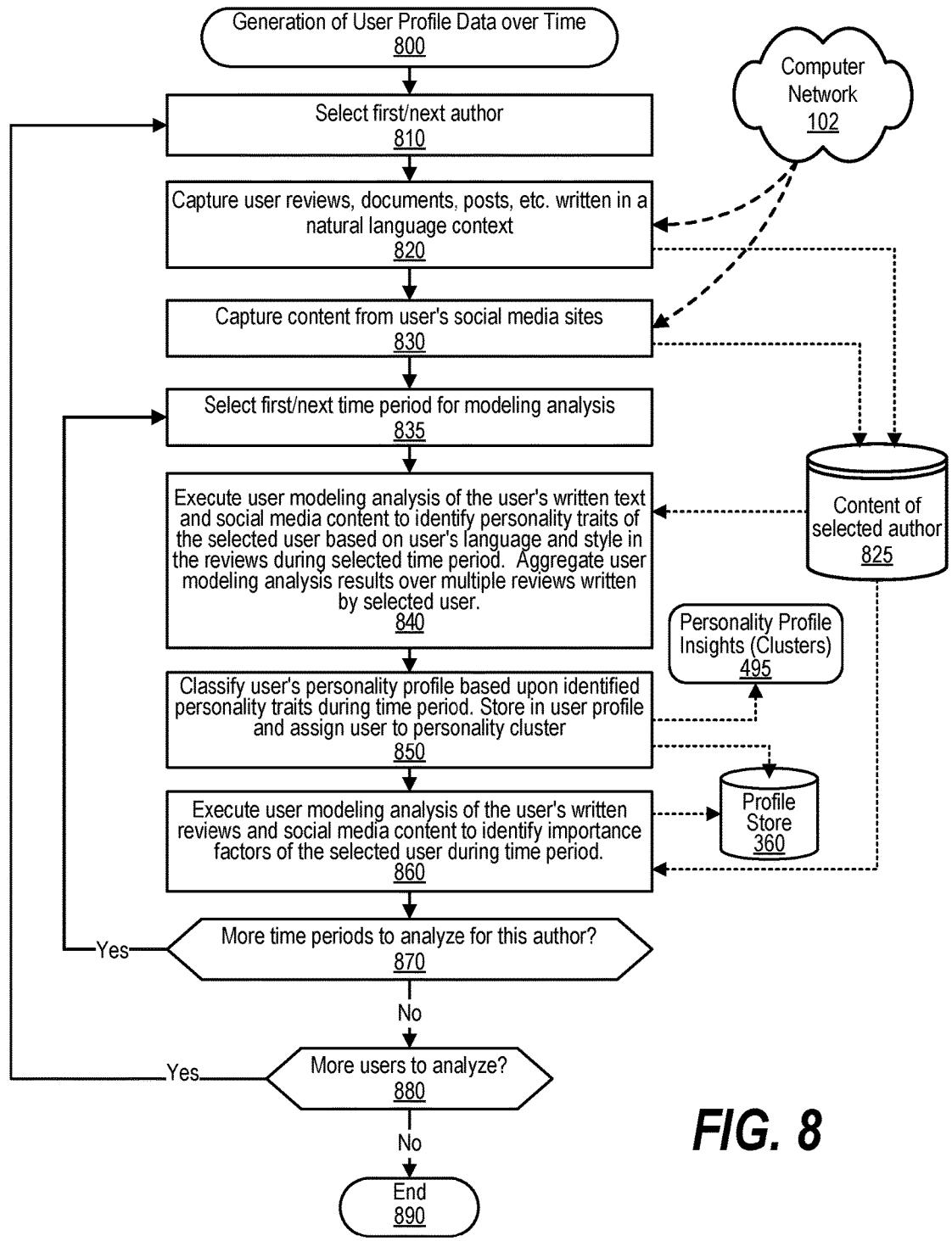
FIG. 8 is a depiction of a flowchart showing the logic used to generate user profile data over different periods of time.

FIG. 8 is a depiction of a flowchart showing the logic used to generate user profile data over different periods of time. FIG. 8 processing commences at 800 and shows the steps taken by a process that generates of author personality profiles over one or more time periods. At step 810, the process selects the first author from a list of authors that have contributed writings that have been ingested by QA system 100. At step 820, the process captures user reviews, documents, posts, etc. written in a natural language context by the selected author. The writings are captured from network-accessible electronic documents available via computer network 102, such as the Internet. The reviews, documents, posts, etc. that are captured are stored in data store 825 for processing. At step 830, the process captures content from user's social media sites and stores such content in data store 825 for processing. At step 835, the process selects the first time period for modeling analysis.

In one embodiment, multiple time periods are analyzed so that an author's personality as it evolves over time can be captured. For example, an author may have had liberal political views early in his or her career, but the same author may now be more moderate or even conservative in his or her views. At step 840, the process executes a user modeling analysis of the author's written text and social media content retrieved from data store 825 to identify personality traits of the selected author based on the author's language and style in the writings of the author during selected time period. Step 840 further aggregates the author modeling analysis results over multiple reviews written by the selected author. At step 850, the process classifies the selected author's personality profile based upon identified personality traits during the selected time period. Step 850 stores the author's personality profile data in data store 360 and assigns the author to one or more personality cluster 495. At step 860, the process executes user modeling analysis of the user's written reviews and social media content to identify importance factors of the selected author during the selected time period. These importance factors are also stored, or associated, with the author's personality profile that is stored in data store 360.

The process determines whether there are more time periods to analyze for the selected author (decision 870). If there are more time periods to analyze, then decision 870 branches to the 'yes' branch which loops back to step 835 to select and process content written by the author during the next time period. This looping continues until there are no more time periods to process, at which point decision 870 branches to the 'no' branch exiting the loop. The process determines as to whether there are more authors to analyze (decision 880). If there are more authors to analyze, then decision 880 branches to the 'yes' branch which loops back to step 810 to select and process the next author that has contributed work ingested by QA system 100. This looping continues until there are no more authors to analyze, at which point decision 880 branches to the 'no' branch exiting the loop. FIG. 8 processing thereafter ends at 890.

FIG. 9 is a depiction of a flowchart showing the logic used to identify author's group personality sentiments over different time periods. FIG. 9 processing commences at 900 and shows the steps taken by a process that groups, or clusters, author personality sentiments (Group PS). At step 910, the process selects the first time period. At step 920, the process selects the first passage attributed to this author during selected time period. At step 925, the process selects the first sentiment-based word/phrase from the selected passage.

At step 930, the process matches the selected sentiment-based word(s) to personality insight words that are associated with different personality clusters (see FIG. 6 for example personality clusters and their associated sentiment words). The process determines whether a match found between the selected sentiment words and one of the personality clusters (decision 940). If a match was found, then decision 940 branches to the 'yes' branch to perform step 950. On the other hand, if no match was found, then decision 940 branches to the 'no' branch bypassing step 950. At step 950, the process weights the selected author's grouped personality sentiment during selected time period to the group (cluster) from which matching sentiment-based word(s) were found. The author's time-period based group personality sentiment scores are stored in memory area 960.

The process determines whether there are more sentiment-based word(s) in the selected passage to process (decision 970). If there are more sentiment-based word(s) in the selected passage to process, then decision 970 branches to the 'yes' branch which loops back to step 925 to select and process the next sentiment words from the selected passage. This looping continues until there are no more sentiment-based word(s) in the selected passage to process, at which point decision 970 branches to the 'no' branch exiting the loop.

The process determines whether there are more passages written by the author during the selected time period (decision 975). If there are more passages written by the author during the selected time period, then decision 975 branches to the 'yes' branch which loops back to step 920 to select and process the next passage that was written during the selected time period. This looping continues until there are no more passages that were written by the author during the selected time period, at which point decision 975 branches to the 'no' branch exiting the loop.

At step 980, the process analyzes the scored author time-period based group personality sentiment from memory area 960 and identifies one or more Group PS (clusters) to associate with the author during the selected time period. This personality sentiment cluster, or clusters, is/are stored in the author's time-period based personality profile insights (clusters) 495. The process next determines whether there are more time periods to process (decision 995). If there are more time periods to process, then decision 995 branches to the 'yes' branch which loops back to step 910 to select and process the next time period as described above. This looping continues until there are no more time periods to process, at which point decision 995 branches to the 'no' branch exiting the loop. FIG. 9 processing thereafter returns to the calling routine (see FIG. 7) at 995.

Figure 10:
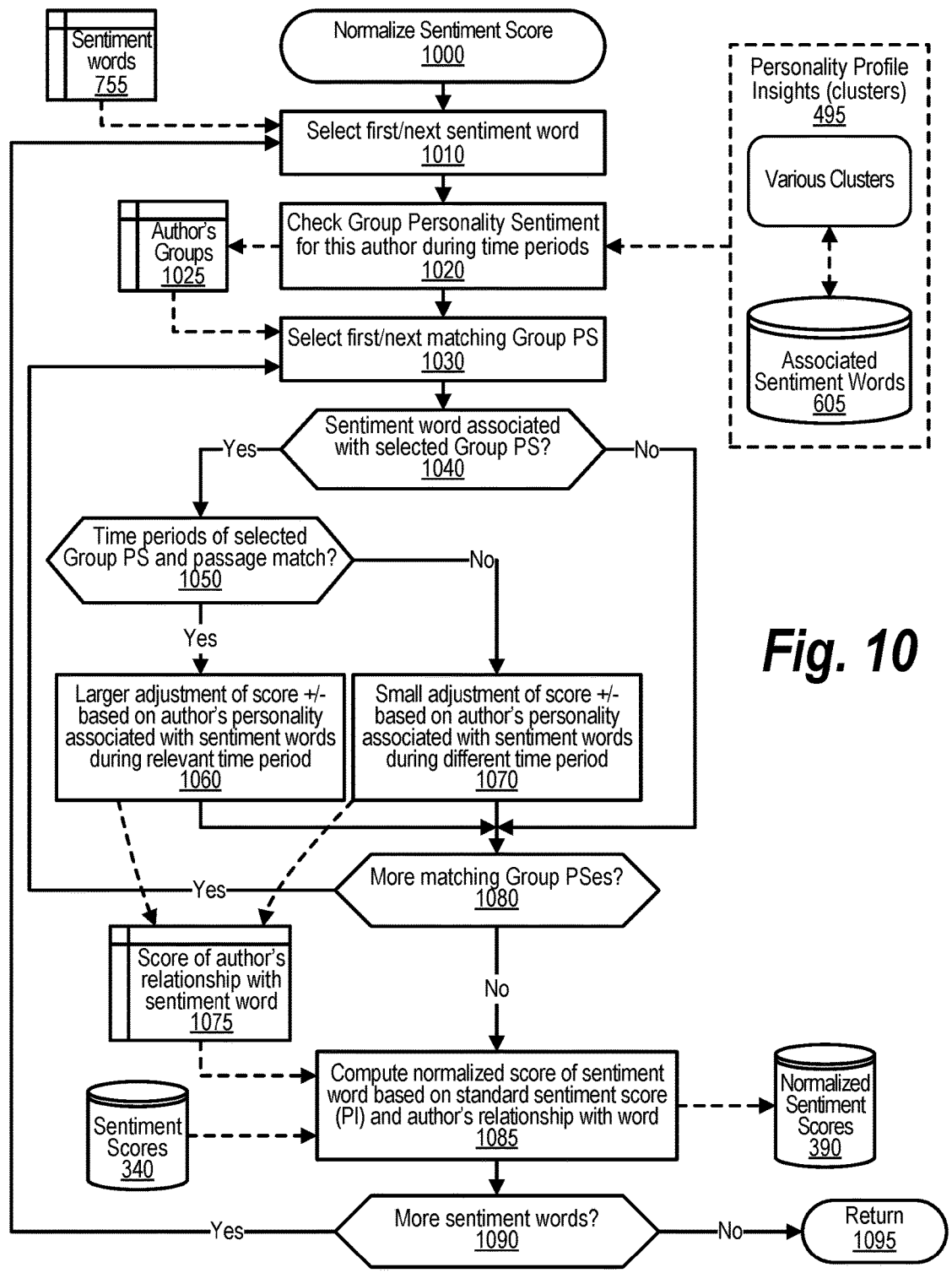
FIG. 10 is a depiction of a flowchart showing the logic used to normalize sentiment scores utilized by the QA system.

FIG. 10 is a depiction of a flowchart showing the logic used to normalize sentiment scores utilized by the QA system. FIG. 10 processing commences at 1000 and shows the steps taken by a process that normalizes sentiment scores. At step 1010, the process selects the first sentiment word from the list of sentiment words that were identified in a passage and stored in memory area 755. At step 1020, the process checks Group Personality Sentiment 495 for this author during various time periods. The author's groups that are found by step 1020 are stored in memory area 1025. At step 1030, the process selects the first matching Group PS from memory area 1025.

The process determines whether the selected sentiment word is associated with the selected Group PS (decision 1040). If the selected sentiment word is associated with the selected Group PS, then decision 1040 branches to the 'yes' branch for further processing to adjust the sentiment score based on the author's personality profile. On the other hand, if the selected sentiment word is not associated with the selected Group PS, then decision 1040 branches to the 'no' branch bypassing steps 1060 and 1070. When the selected sentiment word is associated with the selected Group PS, then process next determines whether the time period of the selected Group PS matches the time period of the passage (decision 1050). If the time periods match, then decision 1050 branches to the 'yes' branch to perform step 1060. On the other hand, if the time periods do not match, then decision 1050 branches to the 'no' branch to perform step 1070.

At step 1060, the process makes a larger adjustment of the sentiment score (up or down) based on the author's personality profile being associated with the selected sentiment words during the relevant time period. Step 1060 stores the adjusted score that indicates the author's relationship with the sentiment word in memory area 1075. At step 1070, the process makes a smaller adjustment of sentiment score (up or down) based on author's personality being associated with the selected sentiment words but during a different time period. Step 1070 stores the adjusted score that indicates the author's relationship with the sentiment word in memory area 1075.

The process determines whether there are more matching Group PSes stored in memory area 1025 that need to be processed (decision 1080). If there are more matching Group PSes stored in memory area 1025 that need to be processed, then decision 1080 branches to the 'yes' branch which loops back to step 1030 to select and process the next matching Group PS from memory area 1025. This looping continues until there are no more matching Group PSes to process in memory area 1025, at which point decision 1080 branches to the 'no' branch exiting the loop.

At step 1085, the process computes a normalized score of the sentiment word based on the standard sentiment score (PI) of the sentiment word that is retrieved from data store 340 and the score pertaining to the author's relationship with word that is retrieved from memory area 1075. The normalized sentiment score of the sentiment word is stored in data store 390.

The process determines as to whether there are more sentiment words to process from memory area 755 (decision 1090). If there are more sentiment words to process, then decision 1090 branches to the 'yes' branch which loops back to step 1010 to select and process the next sentiment word from memory area 755. This looping continues until there are no more sentiment words to process, at which point decision 1090 branches to the 'no' branch exiting the loop. FIG. 10 processing thereafter returns to the calling routine (see FIG. 7) at 1095.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

ingesting a plurality of electronic documents into a corpus utilized by a question answering (QA) system, each of the plurality of electronic documents written by one of a plurality of authors;

generating one or more personality profiles corresponding to one or more of the plurality of authors, wherein the generation of each of the personality profiles comprises:

capturing a set of passages written by each of the authors;

performing an author modeling analysis of the set of passages, wherein the author modeling analysis identifies one or more personality traits of each of the authors based on sentiment-based words found in the set of passages; and classifying each of the authors' personality profiles into one or more personality clusters, wherein each of the personality clusters is associated with one or more sentiment-based words;

analyzing the plurality of electronic documents, wherein the analysis includes performing a normalized sentiment analysis of the plurality of electronic documents resulting in normalized sentiment scores pertaining to each of the plurality of electronic documents, and wherein performing the normalized sentiment analysis comprises performing the following for each of the plurality of electronic documents:

generating a sentiment score pertaining to a textual passage included in the electronic document;

retrieving a personality profile corresponding to the document's author, wherein the retrieved personality profile includes a personality insight pertaining to the document's author; and adjusting the generated sentiment score based on the personality insight, wherein the adjusting results in a normalized sentiment score associated with the corresponding electronic document that is stored in a data store accessible to the QA system;

receiving, at the question answering system, a sentiment-based question; and generating, by the QA system, a qualitative set of one or more candidate answers from the plurality of ingested electronic documents, wherein the candidate answers are responsive to the sentiment-based question, and wherein the candidate answers are based in part on the normalized sentiment scores retrieved from the data store.

2. The method of claim 1 further comprising:

identifying an author of a selected electronic document;

generating a sentiment score pertaining to a textual passage included in the selected electronic document;

comparing one or more words found in the textual passage with the sentiment-based words associated with the personality clusters;

based on the comparison, identifying one or more matching personality clusters;

determining whether the identified author is associated with one of the identified personality clusters; and adjusting the generated sentiment score based on the determination, wherein the adjusting results in the normalized sentiment score that is stored in the data store.

3. The method of claim 2 further comprising:

identifying a time period of the selected electronic document;

determining whether the identified author was associated with one of the personality clusters during the identified time period; and further adjusting the generated sentiment score based on the identified author's association with one of the matching personality clusters during the identified time period.

4. The method of claim 1 further comprising:

identifying an author of a selected electronic document;

identifying a sentiment word included in the selected electronic document;

determining a relationship of the identified sentiment word with the identified author;

generating a standard sentiment score pertaining to the selected electronic document; and computing the normalized sentiment score pertaining to the selected electronic document based on the determined relationship and the standard sentiment score.

5. The method of claim 4 wherein the determination of the relationship of the identified sentiment word with the identified author further comprises:

comparing the identified sentiment word to one or more sentiment words associated with a personality profile that is associated with the identified author, wherein the relationship is stronger when the comparison successfully matches the identified sentiment word to one of the associated sentiment words.

6. An information handling system comprising:
one or more processors;
a memory coupled to at least one of the processors; and
a set of computer program instructions stored in the memory and executed by at least one of the processors in order to perform actions comprising:
ingesting a plurality of electronic documents into a corpus utilized by a question answering (QA) system, each of the plurality of electronic documents written by one of a plurality of authors;
generating one or more personality profiles corresponding to one or more of the plurality of authors, wherein the generation of each of the personality profiles comprises:
capturing a set of passages written by each of the authors;
performing an author modeling analysis of the set of passages, wherein the author modeling analysis identifies one or more personality traits of each of the authors based on sentiment-based words found in the set of passages; and
classifying each of the authors' personality profiles into one or more personality clusters, wherein each of the personality clusters is associated with one or more sentiment-based words;
analyzing the plurality of electronic documents, wherein the analysis includes performing a normalized sentiment analysis of the plurality of electronic documents resulting in normalized sentiment scores pertaining to each of the plurality of electronic documents, and wherein performing the normalized sentiment analysis comprises performing the following for each of the plurality of electronic documents:
generating a sentiment score pertaining to a textual passage included in the electronic document;
retrieving a personality profile corresponding to the document's author, wherein the retrieved personality profile includes a personality insight pertaining to the document's author; and
adjusting the generated sentiment score based on the personality insight, wherein the adjusting results in a normalized sentiment score associated with the corresponding electronic document that is stored in a data store accessible to the QA system;
receiving, at the question answering system, a sentiment-based question; and
generating, by the QA system, a qualitative set of one or more candidate answers from the plurality of ingested electronic documents, wherein the candidate answers are responsive to the sentiment-based question, and wherein the candidate answers are based in part on the normalized sentiment scores retrieved from the data store.

7. The information handling system of claim 6 wherein the actions further comprise:
identifying an author of a selected electronic document;
generating a sentiment score pertaining to a textual passage included in the selected electronic document;
comparing one or more words found in the textual passage with the sentiment-based words associated with the personality clusters;
based on the comparison, identifying one or more matching personality clusters;
determining whether the identified author is associated with one of the identified personality clusters; and
adjusting the generated sentiment score based on the determination, wherein the adjusting results in the normalized sentiment score that is stored in the data store.

8. The information handling system of claim 7 wherein the actions further comprise:
identifying a time period of the selected electronic document;
determining whether the identified author was associated with one of the personality clusters during the identified time period; and
further adjusting the generated sentiment score based on the identified author's association with one of the matching personality clusters during the identified time period.

9. The information handling system of claim 6 wherein the actions further comprise:
identifying an author of a selected electronic document;
identifying a sentiment word included in the selected electronic document;
determining a relationship of the identified sentiment word with the identified author;
generating a standard sentiment score pertaining to the selected electronic document; and
computing the normalized sentiment score pertaining to the selected electronic document based on determined relationship and the standard sentiment score.

10. The information handling system of claim 9 wherein the determination of the relationship of the identified sentiment word with the identified author further comprises:
comparing the identified sentiment word to one or more sentiment words associated with a personality profile that is associated with the identified author, wherein the relationship is stronger when the comparison successfully matches the identified sentiment word to one of the associated sentiment words.

11. A computer program product stored in a computer readable storage medium, comprising computer program code that, when executed by an information handling system, performs actions comprising:
ingesting a plurality of electronic documents into a corpus utilized by a question answering (QA) system, each of the plurality of electronic documents written by a one of a plurality of authors;
generating one or more personality profiles corresponding to one or more of the plurality of authors, wherein the generation of each of the personality profiles comprises:
capturing a set of passages written by each of the authors;
performing an author modeling analysis of the set of passages, wherein the author modeling analysis identifies one or more personality traits of each of the authors based on sentiment-based words found in the set of passages; and
classifying each of the authors' personality profiles into one or more personality clusters, wherein each of the personality clusters is associated with one or more sentiment-based words;
analyzing the plurality of electronic documents, wherein the analysis includes performing a normalized sentiment analysis of the plurality of electronic documents resulting in normalized sentiment scores pertaining to each of the plurality of electronic documents, and wherein performing the normalized sentiment analysis comprises performing the following for each of the plurality of electronic documents:

generating a sentiment score pertaining to a textual passage included in the electronic document;

retrieving a personality profile corresponding to the document's author, wherein the retrieved personality profile includes a personality insight pertaining to the document's author; and adjusting the generated sentiment score based on the personality insight, wherein the adjusting results in a normalized sentiment score associated with the corresponding electronic document that is stored in a data store accessible to the QA system;

receiving, at the question answering system, a sentiment-based question; and generating, by the QA system, a qualitative set of one or more candidate answers from the plurality of ingested electronic documents, wherein the candidate answers are responsive to the sentiment-based question, and wherein the candidate answers are based in part on the normalized sentiment scores retrieved from the data store.

12. The computer program product of claim 11 wherein the actions further comprise:

identifying an author of a selected electronic document;

generating a sentiment score pertaining to a textual passage included in the selected electronic document;

comparing one or more words found in the textual passage with the sentiment-based words associated with the personality clusters;

based on the comparison, identifying one or more matching personality clusters;

determining whether the identified author is associated with one of the identified personality clusters; and adjusting the generated sentiment score based on the determination, wherein the adjusting results in the normalized sentiment score that is stored in the data store.

13. The computer program product of claim 12 wherein the actions further comprise:

identifying a time period of the selected electronic document;

determining whether the identified author was associated with one of the personality clusters during the identified time period; and further adjusting the generated sentiment score based on the identified author's association with one of the matching personality clusters during the identified time period.

14. The computer program product of claim 11 wherein the actions further comprise:

identifying an author of a selected electronic document;

identifying a sentiment word included in the selected electronic document;

determining a relationship of the identified sentiment word with the identified author, wherein the determination includes comparing the identified sentiment word to one or more sentiment words associated with a personality profile that is associated with the identified author, wherein the relationship is stronger when the comparison successfully matches the identified sentiment word to one of the associated sentiment words;

generating a standard sentiment score pertaining to the selected electronic document; and computing the normalized sentiment score pertaining to the selected electronic document based on determined relationship and the standard sentiment score.

* * * * *